United States Patent [19]
Prochazka et al.

[11] 3,993,558
[45] Nov. 23, 1976

[54] METHOD OF SEPARATION OF FISSION AND CORROSION PRODUCTS AND OF CORRESPONDING ISOTOPES FROM LIQUID WASTE

[75] Inventors: Hubert Prochazka, Brno; Karel Stamberg, Prague; Rudolf Jilek, Brno; Pavel Hulak, Ceske Budejovice; Josef Katzer, Prague, all of Czechoslovakia

[73] Assignee: Ceskoslovenska komise pro atomovou energii, Prague, Czechoslovakia

[22] Filed: Mar. 3, 1975

[21] Appl. No.: 555,172

Related U.S. Application Data

[63] Continuation-in-part of Ser. No. 353,527, April 24, 1973, abandoned.

[30] Foreign Application Priority Data

May 16, 1972   Czechoslovakia .................. 3291/72

[52] U.S. Cl. ................................. 210/28; 210/32; 210/37 R
[51] Int. Cl.² ..................................... B01D 15/06
[58] Field of Search .................. 210/24, 28, 30, 32, 210/37, 38, 42; 195/1, 28 R, 52–56, 81

[56]      References Cited
         UNITED STATES PATENTS

| | | | |
|---|---|---|---|
| 2,294,764 | 9/1942 | Urbain et al. | 210/30 |
| 2,616,847 | 11/1952 | Ginell | 210/24 X |
| 2,628,165 | 2/1953 | Bliss | 210/28 X |
| 2,855,269 | 10/1958 | Boyd et al. | 210/24 X |
| 2,980,607 | 4/1961 | Mock et al. | 210/38 X |
| 3,330,771 | 7/1967 | Komatsu et al. | 210/24 X |
| 3,405,050 | 10/1968 | Bovard et al. | 210/24 X |
| 3,520,805 | 7/1970 | Ryan | 210/32 |
| 3,725,291 | 4/1973 | Serbus et al. | 210/24 X |
| 3,767,790 | 10/1973 | Guttag | 195/54 X |

*Primary Examiner*—Charles N. Hart
*Assistant Examiner*—Robert H. Spitzer

[57]      ABSTRACT

Separation of fission and corrosion products and of corresponding stable isotopes from liquid waste. Mycelia of fungi are used as sorbents for retaining said products on their surface and within their pores; the invention includes methods of activation or regeneration of the sorbent.

11 Claims, No Drawings

METHOD OF SEPARATION OF FISSION AND CORROSION PRODUCTS AND OF CORRESPONDING ISOTOPES FROM LIQUID WASTE

This application is a continuation-in-part of application Ser. No. 353,527, filed April 24, 1973, now abandoned.

This invention relates to a method of separation of fission and corrosion products and of corresponding stable isotopes from liquid waste by sorption by means of mycelia of fungi.

This invention is related to the co-assigned applications of PROCHAZKA ET AL, Ser. No. 322,499, filed Jan. 10, 1973, and of NEMEC ET AL, Ser. No. 331,659, filed Feb. 12, 1973.

Due to fission of nuclei of heavy radioactive elements such as U-235, U-233, Pu-239 and the like, fission products - nuclides are produced, the atomic and mass nambers of which are rather different and cover a substantial pat of Mendeleev's table. Due to fission of U-235, about 180 radioactive nuclides (unstable isotopes of elements) are produced having atomic numbers within the range of about 30 to 65 and mass numbers about 72 to 161. The probability of origin of a certain nuclide is usually indicated by the so-called fission yield, from the point of view of which it is possible to differentiate a group of light products, with maximum yields, for instance, for Zr-95 and Nb-95, and a group of heavy products, with maximum yields, for instance, for Ba-140, La-140, Xe-133 and the like.

Another point of view for classifying these elements, which point of view is more important for decontamination and cleaning, is the half-life of the respective active isotopes and the danger to the human organism due to influences of fission products. It is possible to classify the more important nuclides according to the half-life as follows: Cs-137 (Sr-90+Y-90), Kr-85, Pm-147, Eu-155, (Ru-106+Rh-106), (Ce-144+Pr-144), Sn-123, Te-127, Zr-95, Y-91, Sr-89, Nb-95, Tl-129, Ce-141, I-131, and La-140.

As far as the degree of danger for the human organism is concerned, attention should be paid primarily to nuclides which are deposited in some organs of the human body, as for instance, strontium, iodine, cesium, barium and the like.

Alkali-metals, earth alkali metals, transition elements, halogenides, rare earth elements and other groups of elements are present in the fission products. Their separation from aqueous waste requires, of course, the application of different processes and methods corresponding to the different chemical and physical properties of the fission products. Actual cleaning processes used for neutralizing radioactive waste are based on principles such as evaporation, precipitation, co-precipitation, and sorption (on organic or inorganic types of ion exchangers or on sorbents generally).

SUMMARY OF THE INVENTION

The method of separation of stable and unstable isotopes of the above-mentioned elements from liquid waste according to this invention is based on the application of sorbents of suitable porosity and shape with functional groups forming chelates and exchange groups. According to this invention, mycelia of fungi are used, namely materials formed on the basis of proteins, hexosamines, polysaccharides, nuclear acids, intermedial metabilities and materials of the type of chelate resins. Mycelia of fungi of strains, for instance, Pennici-lium chrysogenum, mycelium sterilium, aspergillus ochraceus and the like, stiffened by resorcinol-formaldehyde, urea-formaldehyde or by some other resin, proved to be suitable for this purpose.

From the purely chemical point of view, mycelia of low class fungi are a complicated mixture of both high and low molecular weight substances as well as inorganic compounds. They contain above all proteins (i.e. both free and bonded amino acids, such as, for example, glycine, alanine, valine, leucine, isoleucine, proline, threonine, tyrosine, aspartic acid, glutamic acid, lysine etc.), both neutral and nitrogenous polysaccharides (e.g. laminarine, galactomannitan, nitrogenous chitin, glucose, mannose, N-acetylglucosamine etc.), polynucleotides and compounds of phosphorus (e.g. cytosin, uracil, adenine, further phospholipides, inorganic phosphates etc.), fatty substances derived from fatty acids containing from 12 to 20 carbon atoms (e.g. palmitic, stearic, oleic and linoleic acids).

An advantage of the method according to this invention is the fact that one type of sorbent is used for separation of all mentioned stable and unstable isotopes of elements of fission and corrosion products, which sorbent can be, according to need, regenerated only by a suitable process. There are substantially three possible alternatives of application, for instance, of a stiffened mycelium penicillium chrysogenum:

a. without application of activation or regeneration, that is, following a fundamental working cycle sorption-elution-sorption-elution and so forth, which is suitable for the majority of fission products with the exception of I-131, and of anionic forms of nuclides generally, furthermore, for instance, Cs, partially also of Sr and the like.

b. with application of a single stage regeneration which process we call a "sorption-precipitation method." The fundamental working cycle is composed of the operations of sorption-elution-regeneration-sorption and so forth, whereby the regeneration is introduced according to need, for instance, to each third to fifth cycle.

The most widely used decontamination principles are present in a method which combines sorption, which has the advantages of simplicity of the technological process, simplicity of the respective apparatus, good economy, and other benefits with coprecipitation or precipitation, both of which have high decontamination effectiveness. By a suitable chosen regeneration or actuation process, whereby the biosorbent is, for instance, converted to $Ag^+$, $Pb^{++}$, $Fe^{+++}$ and by a similar process, we achieve in the course of the following sorption (that is, of the proper cleaning or decontamination operation) the formation of microcrystalline precipitates within the pores and on the surface of the biosorbent. The chemical composition of the created precipitate is determined by the regeneration process and by the composition of the cleaned liquid. The anionic component forming the precipitate is either directly the active contamination (for instance I-131 as $1^-$, $10_4^+$. $10_3^-$) or some macrocomponent (for instance $SO_4^{2-}$, $CO_3^{2-}$, $HCO_3^-$, $OH^-$ and the like), due to its reaction with the cationic component a precipitate is formed with a possibly maximum "take along" capability for contaminations present therein.

By this method it is possible to separate the majority of contaminations from waste waters. With respect to the method (a) above it is possible also to separate additionally anionic contaminations, as for instance, the already mentioned iodine, after regeneration with $AgNO_3$, for instance.

c. with the application of a two or more stage activation or regeneration, where the biosorbent is converted in the first stage into a cycle of a cation forming a precipitate ($Fe^{2+}$, $Zn^{2+}$, $Cu^{2+}$, $Mn^{2+}$, $Fe^{3+}$, $Al^{3+}$, and the like) or their mixtures ($Zn^{2+} + Al^{3+}$, $Ag^+ + Fe^{3+}$ and the like), in the second stage a solution acts on the biosorbent, said solution containing an anionic component forming a precipitate (for instance, $OH^-$, $CO_3^{2-}$, $Fe(CN)_6^{4-}$ and the like). Thus the sorbent is prepared in such manner that the biosorbent is in the first place a supporting skeleton (it has the required properties, namely porosity, sorption of electrolytes and the like) and the created precipitate is the proper sorbent having properties similar to analogous types of synthetic ion exchangers on the basis of hydrated oxides, unsoluble ferro- and ferricyanides and the like. It is known from technical papers (G. B. Amphlett: Inorganic Ion Exchangers, Amsterdam, 1964) that these types of synthetic ion exchangers have sorption properties for a number of nuclides, particularly for alkali metals and earth alkali metals (see nuclides with longest half lives: Cs-137 33 years, Sr-90 19.9 years). The fundamental working cycle is substantially the same as in alternative (b) including the periodically introduced regeneration process according to need.

The three alternatives of application of, for instance, a stiffened mycelium of fungi of the strain penicillium chrysogenum, as indicated in (a) to (c) above enable the separation of stable and unstable isotopes of the mentioned elements which are present both in the cationic or anionic state. The regeneration of the biosorbent (see (b) and (c) above) converts the resulting sorption properties towards an increase of the selectivity to individual elements or groups of elements by means which are technically easy to apply and are economically advantageous.

The aternatives mentioned, (a) to (c), can also be used for a single sorption process (for instance, for highly active waste), where it is undesirable to wash out the retained radioactive material back into the elution solution, but it is left in the solid phase. In such a case, the biosorbent can be burnt in a suitable arragement at temperatures of about 500° to 800° C, and the volume of the contaminated solid phase can be thus substantially reduced prior to storage in suitable storage places for radioactive waste.

The basic substance which characterizes the properties of the sorbents, are mycelia of fungi (as e.g. of species ASCOMYCETES, strain PENICILLIUM CHRYSOGENUM) which, however, are used in the preparation of sorbents in the dry, non-live form. If a mycelium is used for preparing sorbents in its native or live stage, then during the preparation all the biological and biochemical process will stop, so that the sorbent is in any case an absolutely non-live substance. The preparation proper of these sorbent types called "biosorbents" constitutes the subject matter of the copending Nemec et al patent application Ser. No. 331,659.

Biosorbents of the type R have been prepared by reinforcing a dry mycelium of the strain Penicillium chrysogenum with resorcinal/formaldehyde resin. Biosorbents of the type M have been prepared by reinforcing the same mycelium with urea-formaldehyde resin. The actual methods of preparation have been described in Examples 1 and 3, respectively, of patent application Ser. No. 331,659. As mentioned above, for preparing sorbents and biosorbents, respectively, there were used fungi mycelia dried up and comminuted to a particle size of from 0.01 to 3.0 mm, cultivated on classes Ascomycetes, Actinomycetes, Basibiomycetes and genus Mycelia sterilia, such as, for instance strains Penicillium chrysogenum (waste from penicillin production), Aspergillus niger (waste from citric acid production), Streptomyces aueofaciens (waste from tetracyclin production), Aspergillus ochraceus 63B (see Czechoslovakian Patent Application No. PV 1851-68) and Mycelium sterilium No. 80 (see the cultivation method according to the Czechoslovakian Pat. application No. 140,576 of Mar. 15, 1971). The latter is a lignovorous fungus used for decomposing a lignin polymer of the sulphite waste liquor.

The procedure of reinforcing the afore-memtioned mycelia by e.g. urea-formaldehyde resin is the same as referred to in Example 3 of the copending Nemec et al U.S. Pat. application Ser. No. 331,659. The final product, i.e. a sorbent or biosorbent, showed the following uranium sorption capacities (for the procedure of determining the capacity see the last-mentioned U.S. patent application):

| | |
|---|---|
| 60.7 mg U/g | reinforced mycelium of Aspergillus niger |
| 108.3 mg U/g | reinforced mycelium of Aspergillus ochraceus 63B |
| 80.0 mg U/g | reinforced mycelium of Streptomyces aureofaciens |
| 104.2 mg U/g | reinforced mycelium of Mycelium sterilium No. 80 |

EXAMPLE 1

Into a waste water, containing a mixture of fission and corrosion products, that is, isotopes of, for instance, Mo, Mn, Fe, Co, Sr+Y, Ru+Rh, Cs, Ce, La, Pm having an overall activity, for instance, on the order of $10^{-2}$ Ci/liter and having a pH value within the neutral range, a biosorbent of the type R (defined above) was added in a volume amount of 1 to 1000 and the mixture was intensively stirred for 20 minutes. After separating the solid and liquid phase, the overall activity of the waste water was reduced to $10^{-4}$ Ci/liter.

EXAMPLE 2

By adjustment of the pH value of the waste water as described in Example 1, for instance by the addition of NaOH to the value of 8 to 9.5, the overall activity was reduced by this process to the order of $10^{-5}$ Ci/liter.

EXAMPLE 3

In a decontamination process as described in Examples 1 and 2, a biosorbent of some other type, for instance, of the type M (defined above) was applied with the same result.

EXAMPLE 4

Waste water as used in Example 1 was allowed to pass through a pressure column with a solid biosorbent bed of the type M at a specific load of the column 10 to 20 volumes to a volume-hour. The specific load will be in the following indicated as (a). By passage through the column a reduction of the overall activity of the waste water was achieved to $10^{-4}$ Ci/liter for the first 300 to 500 volumes per volume of the bisorbent.

EXAMPLE 5

Waste water as used in Example 2 was decontaminated by the process described in Example 4. By passage through a column the overall activity was reduced to the order of $10^{-6}$ Ci/liter for about the first 500 volumes per volume of the biosorbent.

EXAMPLE 6

Waste water is used in Examples 1 and 2 was caused to pass through a pressure column with a solid biosorbent bed regenerated with 20 volumes per volume of 0.1M $FeCl_3$ and washed with 20 volumes/volume of tap water at a=20. By passage of the contaminated water through this column a reduction of the overall activity was achieved to $10^{-5}$ to $10^{-7}$ Ci/liter for the first 500 volumes.

EXAMPLE 7

Under conditions as in Example 6, the regeneration solution of 0.1M $FeCl_3$ was replaced by 0.1M $Al(NO_3)_3$. The decontamination effect remained the same.

EXAMPLE 8

The alternatives of Examples 6 and 7 were modified in that the biosorbent was treated in a first stage by the mentioned regeneration solutions $FeCl_3$ or $Al(NO_3)_3$ and after washing in a second stage by a solution of NaOH. This alternative provided for the first about 700 volumes to the volume of the biosorbent the same decontamination effect as in Examples 6 and 7.

EXAMPLE 9

The process described in Example 8 was modified so that for treating of the biosorbent prior to sorption as aqueous solution of 0.1M $MnSO_4$ was used in the first stage, in the second stage a solution of $KMnO_4$ having the same molar concentration being used with a following sorption. This regeneration process of the biosorbent is particularly suitable for waste waters containing isotopes of Cr, Co, Fe, Ca, Sr+Y, S, P, Te, Ra and of lanthamides. The decontamination effect for mixtures of the above-mentioned types with the initial activity $10^{-2}$ Ci/liter was about 90 percent.

EXAMPLE 10

The method described in Example 9 was modified for this type of waste water so that an additional third stage was added to the first two regeneration stages by washing the sorbent in the column with 20 volumes/volume of sorbent with a solution of 0.1M NaOH. The overall activity of the solution was thus reduced to about $10^{-6}$ Ci/liter.

EXAMPLE 11

The method described in Example 8 was modified for contamination of waste water containing mostly isotopes of Cs, Sr, Zr, Nb, Ru and Ce so that the regeneration of the sorbent was accomplished in the first stage by an aqueous solution of 0.1M $Fe(SO_4)_2$ or 0.1M $CuSO_4$ or $FeCl_3$ and in the second stage by an aqueous solution of 0.1M $K_4Fe(CN)_6$. The resulting activity was reduced by this process to the order to $10^{-6}$ Ci/liter.

EXAMPLE 12

The method described in Example 6 was modified for contaminated water containing mostly isotopes of I, Ru, Co, Ra and La so that the regeneration of the sorbent in the column was accomplished by an aqueous solution of a mixture of 0.1M $AgNO_3$ and 0.1M $Fe(NO_3)_3$. The decontamination effect remained the same.

EXAMPLE 13

The methods described in Examples 4 to 12 can be analogously used with biosorbents of other types, for instance, of the type M.

EXAMPLE 14

Isotopes of elements retained by the methods described in Examples 1 to 13, inclusive, can be, so far as is advantageous, concentrated by burning the biosorbent and by storing the ashes according to existing rules. The volume of the enriched biosorbent is reduced by burning by 95 to 99 percent, that is, only 1 to 5 percent remains after burning.

EXAMPLE 15

In a column of 10 mm inner diameter and 140 mm height 10 ml of swelled biosorbent was placed; the biosorbent was prepared by reinforcing dry mycelium of the strain Aspergillus ochraceus 63B according to our U.S. Pat. application Ser. No. 331,659. The biosorbent was activated by regeneration described in Example 9. Over the regenerated and with distilled water washed-through biosorbent there was passed a solution containing 600 pico-curie 226Ra/liter and having PH-value of from 6.5 to 7. During the throughflow of the first ten liters the concentration on the column outlet varied on the background level, i.e. below 10 pico-curie 226Ra/liter. The solution was then eluted with 200 ml of 0.1N hydrochloric acid whereby about 90 percent of the adsorbed radium was extracted into the eluate. The throughflow rate during the sorption was being maintained at 2ml/min. and during the elution at about 0.5 ml/min.

EXAMPLE 16

The sorption and elution of 226 Ra was determined as referred to in Example 15, except that there was used biosorbent prepared by reinforcing mycelium of the strain Mycelium sterilium No. 80 (see out U.S. Pat. application No. 331,659) reinforced with unreaformaldehyde resin; it holds also for the biosorbent according to EXAMPLE 15. The same results as in Example 15 were obtained.

EXAMPLE 17

The sorption and elution of radium was effected as referred to in Example 16, except that for the elution a solution of 0.1N nitric acid + 1.M ammonium nitrate was used; about 90 percent of the adsorbed radium was eluted off during the throughflow of the first about 150 ml of the solution.

EXAMPLE 18

The sorption and elution of radium was effected as referred to in Example 17, except that for the elution a 0.1N HCl + 1 M NaCl solution was used; the same results as in Example 17 were obtained.

EXAMPLE 19

Into a column of 10 mm inner diameter and 140 mm height 10 ml of swelled biosorbent M was placed; the biosorbent was prepared by reinforcing dry mycelium of Penicillium chrysogenum with unreaformaldehyde resin as described in the U.S. Pat. application Ser. No.

331,659, and activated in the first stage with 150 ml 0.1 M calcium chloride and in the second stage with 10 ml 0.1 N sodium carbonate. The column was then passed through, at the rate of 2 ml/min., with a solution having the concentration of 3 mg U/liter and pH-value of about 3.5. The concentration of the first six liters of the solution downstream of the column was lower than 0.05 mg U/liter. During the subsequent elution with a solution of 2 M sodium chloride + 0.05 M sodium carbonate 90 percent of the adsorbed uranium was extracted by the throughflow of 200 ml of eluent.

The isotopes of elements retained by the methods described in the examples can be washed out from the sorbents by some elution agent, the composition of which has to be chosen according to the composition of the decontaminated solution. In most cases aqueous solutions of $0.1N$ HCl, $0.1N$ HNO$_3$, or $0.1 N$ H$_2$SO$_4$ are suitable elution agents; these are applied to the sorbent in the column at a specific load a=1 to 2 volumes per volume hour in an amount of 20 volumes for one volume of the sorbent. From 90 to 98 percent of the retained elements are recuperated by elution. The sorbent can be subsequently repeatedly used by the described methods for a further cleaning of the water.

Although the invention is illustrated and described with reference to a plurality of preferred embodiments thereof, it is to be understood that it is in no way limited to the disclosure of such a plurality of embodiments, but is capable of numerous modifications within the scope of the appended claims.

We claim:

1. Method of separation of fission and corrosion products as well as corresponding isotopes from liquid waste by using therefor biosorbents having chelate-forming and active exchange groups, comprising the steps of contacting the liquid waste with a biosorbent to form a precipitate inside the pores and on the surface of the biosorbent, the biosorbent being then activated by an at least two-stage regeneration, in the first stage the biosorbent being regenerated by being eluted with solutions of compounds selected from the group consisting of ferric chloride, aluminum nitrate, copper sulphate, calcium chloride and manganese sulphate having a concentration of from 0.1M to saturation so that the cationic component thereof is recaptured onto the biosorbent, and in the second stage the biosorbent being regenerated by eluting with a solution of compounds selected from the group consisting of sodium hydroxide, potassium ferrocyanide, sodium carbonate and potassium permanganate having a concentration of from 0.1 M to saturation, the anionic component of which is capable of reacting with the recaptured cation thereby giving rise to a precipitate inside the pores and on the surface of the biosorbent.

2. Method as claimed in claim 1, wherein in the first stage of said regeneration the biosorbent is treated by one of the regeneration solutions FeCl$_3$ and Al NO$_3$, and in the second stage of regeneration is treated by a solution of NaOH.

3. Method as claimed in claim 1, wherein said first regeneration stage the biosorbent is treated with an aqueous solution of MnSO$_4$, and in the second stage is treated with a solution of KMnO$_4$.

4. Method as claimed in claim 1, comprising treating the biosorbent after the second regeneration stage in an additional third regeneration stage, comprising washing the sorbent with a solution of 0.1M NaOH.

5. Method as claimed in claim 1, wherein in the first stage of said regeneration to biosorbent is treated with a 0.1M solution of calcium chloride, and in the second regeneration stage is treated with a 0.1N solution of sodium carbide.

6. Method as in claim 1, comprising burning the contaminated sorbent for storage purposes, thus reducing the volume thereof while maintaining its original activity.

7. Method of separation of fission and corrosion products as well as corresponding isotopes from liquid waste by using biosorbents having chelate-forming and active exchange groups, comprising the steps of contacting the liquid waste with a biosorbent to form a precipitate inside the pores and on the surface of the biosorbent, the biosorbent being then activated by an at least two-stage regeneration, in the first stage the biosorbent being regenerated by being eluted with solutions of compounds selected from the group consisting of hydrochloric acid, nitric acid, sodium chloride, ammonium nitrate and sodium carbonate having a concentration of from 0.1M to saturation so that the cationic component thereof is recaptured onto the biosorbent, and in the second stage the biosorbent being regenerated by eluting with a solution of compounds selected from the group consisting of sodium hydroxide, potassium ferrocyanide, sodium carbonate and potassium permanganate having a concentration of from 0.1 M to saturation, the anionic component of which is capable of reacting with the recaptured cation thereby giving rise to a precipitate inside the pores and on the surface of the biosorbent.

8. Method as claimed in claim 7, wherein the biosorbent in the first stage of regeneration is treated by being eluted with a 0.1N solution of hydrochloric acid.

9. Method as claimed in claim 7, wherein the biosorbent is treated in the first regenerating stage by being eluted with a solution of 0.1N nitric acid plus 1.M ammonium nitrate.

10. Method as claimed in claim 7, wherein the biosorbent is treated in the second regenerating stage by being eluted with a 0.1N solution of hydrochloric acid plus 0.1N solution of Na$_2$CO$_3$.

11. Method as in claim 7, comprising burning the contaminated sorbent storage purposes, thus reducing the volume thereof while maintaining its original activity.

* * * * *